Nov. 23, 1971  G. H. MONTALBO  3,621,853
DENTAL FLOSS HOLDING DEVICE
Filed Nov. 24, 1969
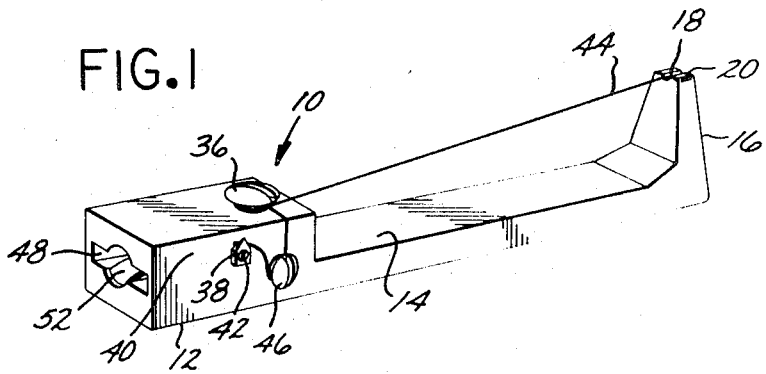
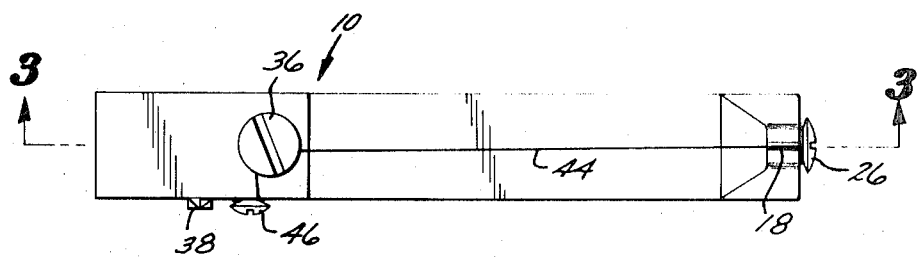
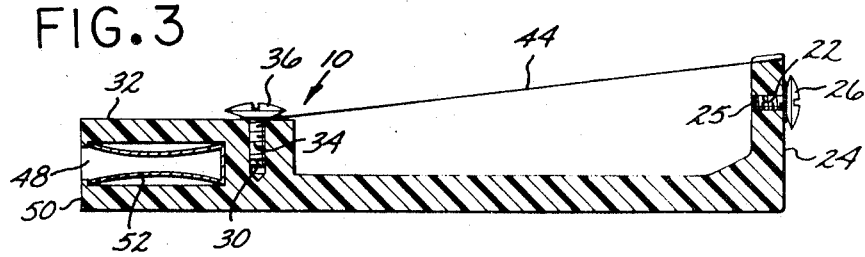
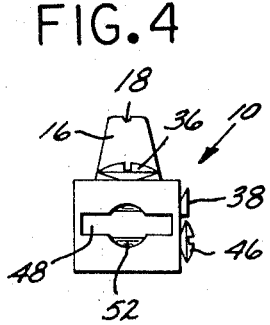
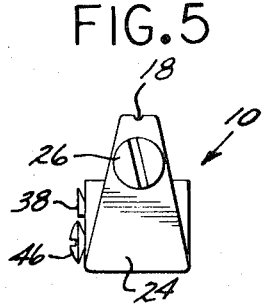
INVENTOR.
GEORGE H. MONTALBO
BY
William G. Babcock
ATTORNEY

United States Patent Office 3,621,853
Patented Nov. 23, 1971

3,621,853
DENTAL FLOSS HOLDING DEVICE
George H. Montalbo, 1667 W. 208th St. 3,
Torrance, Calif. 90501
Filed Nov. 24, 1969, Ser. No. 879,300
Int. Cl. A61c 15/00
U.S. Cl. 132—89  6 Claims

ABSTRACT OF THE DISCLOSURE

A device including an elongate handle adapted to be gripped manually by a user or mounted on the reciprocating portion of a power-driven toothbrush whereby a taut length of dental floss may be removably supported therein and used for dental hygiene purposes.

BACKGROUND OF THE INVENTION

Field of the invention

A dental floss holding device that may be used either manually or when mounted on the reciprocating portion of a power-driven toothbrush.

DESCRIPTION OF THE PRIOR ART

Dental floss is normally retailed in a wound condition on a spool encased in a housing. A length of the floss may be removed from such housing and used for dental hygienic purposes. Dental floss so removed from a housing is difficult to use, due to the fact that a length thereof is supported between two hands of the user in an awkward position for insertion into mouth.

A major object of the present invention is to furnish a device that supports a length of dental floss in a taut condition, whereby it may be easily used for dental hygienic purposes, and with no more difficulty than in using a toothbrush.

Another object of the invention is to provide a dental floss container of relatively simple mechanical structure, can be fabricated from standard, conveniently available materials, and retailed at a sufficiently low price as to encourage the widespread use thereof.

SUMMARY OF THE INVENTION

An integrally formed body of polymerized resin including a handle, an elongate member extending forwardly therefrom, which member terminates in a direction normal to an arm in which a longitudinal groove is formed in the upper portion thereof. First and second screws are mounted on the arm and handle, both of which permit looped portions of a length of dental floss to be removably secured thereto, with the screws removably holding looped end portions of the length of dental floss thereon, with the length thereof being supported in a taut longitudinal position on the body and end extending between the arm and handle.

A major object of the present invention is to provide a device which so supports a length of dental floss in a taut longitudinal position thereon, whereby said length may be used for hygienic dental purposes.

Another object of the invention is to furnish a dental floss container that can be used normally when the handle thereof is gripped between the thumb and forefinger, or if desired, the device may be removably mounted on the reciprocating portion of a power-driven toothbrush.

An additional object of the present invention is to provide a dental floss holding device of relatively simple mechanical structure and adapted to be fabricated from standard, commercially available materials, which device is retailed at a sufficiently low price so as to encourage the widespread use thereof.

BRIEF DESCRIPTION OF THE DRAWINGS

FIG. 1 is a perspective view of the device supporting a length of dental floss in a taut longitudinally extending position;

FIG. 2 is a top plan view of the device;

FIG. 3 is a longitudinal cross-sectional view of the device;

FIG. 4 is a rear end elevational view of the device; and

FIG. 5 is a front elevational view of the device.

DESCRIPTION OF THE PREFERRED EMBODIMENTS

The dental floss-holding device, as may best be seen in FIGS. 1 and 3, includes a body 10 that is preferably molded from a polymerized resin or other suitable nonmetallic material.

Body 10 includes a handle 12 of substantial length from which an elongate member 14 extends forwardly to terminate in an arm 16 that is disposed in a direction normal thereto. Arm 16 is provided in which a longitudinal slot 18 formed in a top surface thereof. A first tapered bore 22 extends rearwardly in arm 16 from a forward surface 24 thereof.

First bore 22 is threadedly engaged by a first screw 25 which has a tapered head 26. A second tapped bore 30 extends downwardly in handle 12 from an upper surface 32 thereof. The second bore 30 is threadedly engaged by a second screw 34 the head 36 of which is tapered. First screw 25, second screw 34, and groove 18 are in longitudinal alignment.

A tapered, shielded knife 38 is mounted on a side surface 40 of handle 12. A screw 42 extends through an opening (not shown) in knife 38, and engages a tapped bore (not shown) formed in handle 12.

A piece of dental floss is unwound from the dispenser (not shown) in which it is retailed, with an end portion thereof formed into a binding loop in the space between first screw head 26 and surface 24. The piece of dental floss is extended through the groove 18 and then rearwardly. Tension is placed on the piece of dental floss, and while so tensioned a rear portion thereof is formed into a binding loop in a space defined between the second screw head 36 and surface 32 of handle 12. A length 44 of taut dental floss is then removably positioned on the body 10 as shown in FIGS. 1 and 3. The length 44 of dental floss is thereafter severed from a longer piece (not shown) of which it initially formed a part by bringing the dental floss into contact with knife.

A third screw 46 may be provided, if desired, that extends into the handle 12 from the surface 40 thereof, with the screw 46 being located forwardly from the knife 38. Prior to severance of the dental floss it is conveniently looped about screw 46.

An elongate recess 48 extends forwardly in the handle 12 from the rear surface 50 thereof. A resilient spring clip 52 is disposed in recess 48. The recess 48 and clip 52 are of such size and shape as to removably engage an end section (not shown) of the reciprocating portion of a power-driven toothbrush.

When a length of dental floss 44 is supported in a taut condition on body 10 it may be used for hygienic dental purposes in a conventional manner.

I claim:
1. A device that may be used either manually or with a power-operated toothbrush to hold a length of dental floss in a taut condition to permit the floss to be used for dental hygienic purposes, including:
   (a) a body formed from a polymerized resin that includes an elongate handle, an elongate member longitudinally aligned with said handle and extending for- wardly from a first side portion thereof, and an arm disposed in a direction normal to said elongate member on the forward end thereof, with said arm having a groove formed in the free end thereof in longitudinal alignment with said member, and with a first tapped bore that extends into said arm from a first forward surface thereof and a second tapped bore that extends into said handle from a second top surface thereof;

(b) first means on said handle for removably supporting said body from a reciprocating portion of a power-driven toothbrush;

(c) first and second screws that threadedly engage said first and second tapped bores, which screws are provided with tapered heads which cooperate with the surfaces of the body most adjacent thereto to define annulus-shaped spaces of triangular cross section in which looped ends of a length of taut dental floss may be held in binding engagement when said length extends through said groove; and (d) second means on said handle for severing said length of floss from a longer piece thereof after said length has been disposed in said taut condition to extend between said first and second screws.

2. A device as defined in claim 1 where said handle is sufficiently long as to be gripped between the thumb and forefinger of the user.

3. A device as defined in claim 1 wherein said first means comprises:

(e) a recess in said handle that extends forwardly from the rear end thereof; and (f) a spring means in said recess for removably engaging said reciprocating portion.

4. A device as defined in claim 1 wherein said second means further comprises:

(e) a flat-shielded knife disposed in abutting contact with a side surface of said handle; and (f) third means for securing said knife in a fixed position relative to said handle.

5. A device as defined in claim 4 wherein said third means comprises a screw that extends through an opening in said knife to engage a tapped bore in said handle.

6. A device as defined in claim 4 which further includes:

(g) a third screw that engages a tapped bore in said handle adjacent to said knife, a portion of which floss is wrapped therearound prior to severing said length of floss from said piece of floss.

References Cited

UNITED STATES PATENTS

| | | | |
|---|---|---|---|
| 1,475,986 | 12/1923 | Cooke | 132—92 R |
| 2,607,358 | 8/1952 | Maas | 132—92 R |
| 2,735,436 | 2/1956 | Russo | 132—91 |
| 3,421,524 | 1/1969 | Waters | 132—92 R |

LOUIS G. MANCENE, Primary Examiner

G. E. McNEILL, Assistant Examiner